(12) United States Patent
Huang et al.

(10) Patent No.: US 12,135,458 B2
(45) Date of Patent: Nov. 5, 2024

(54) ARRAYED VISUAL INSPECTORS FOR FIBER CONNECTORS AND ADAPTERS

(71) Applicant: Panduit Corp., Tinley Park, IL (US)

(72) Inventors: Yu Huang, Orland Park, IL (US); Jose M. Castro, Naperville, IL (US); Andrew R. Matcha, Chicago, IL (US)

(73) Assignee: Panduit Corp., Tinley Park, IL (US)

( * ) Notice: Subject to any disclaimer, the term of this patent is extended or adjusted under 35 U.S.C. 154(b) by 389 days.

(21) Appl. No.: 17/447,603

(22) Filed: Sep. 14, 2021

(65) Prior Publication Data

US 2022/0091342 A1 Mar. 24, 2022

Related U.S. Application Data (60) Provisional application No. 63/080,971, filed on Sep. 21, 2020.

(51) Int. Cl.
| | | |
|---|---|---|
| *G02B 6/38* | (2006.01) | |
| *G02B 21/00* | (2006.01) | |
| *G02B 21/36* | (2006.01) | |

(52) U.S. Cl.
CPC ........... *G02B 6/385* (2013.01); *G02B 6/3879* (2013.01); *G02B 21/0016* (2013.01); *G02B 21/0032* (2013.01); *G02B 21/361* (2013.01)

(58) Field of Classification Search
None
See application file for complete search history.

(56) References Cited

U.S. PATENT DOCUMENTS

| | | |
|---|---|---|
| 5,179,419 A | 1/1993 | Palmquist et al. |
| 5,196,899 A | 3/1993 | Serwatka |
| 5,459,564 A | 10/1995 | Chivers |
| 5,953,113 A | 9/1999 | Poffenbarger |
| 6,751,017 B2 | 6/2004 | Cassady |
| 7,042,562 B2 | 5/2006 | Gessel et al. |
| 8,208,134 B1 | 6/2012 | Gunal |
| 9,151,694 B2 | 10/2015 | Endresen et al. |
| 9,217,688 B2 | 12/2015 | Dolznikovas et al. |
| 9,417,444 B2 | 8/2016 | Chang et al. |
| 10,006,831 B2 | 6/2018 | Hadama et al. |
| 10,175,142 B2 | 1/2019 | Baribault et al. |
| 10,341,550 B2 | 7/2019 | Miyake et al. |
| 10,521,922 B2 | 12/2019 | Takasu |
| 10,627,310 B2 | 4/2020 | Gavrilinas et al. |
| 2013/0188195 A1* | 7/2013 | Messerschmidt .... G02B 27/141 356/477 |
| 2015/0092043 A1* | 4/2015 | Baribault ............... G01M 11/31 348/125 |
| 2019/0079249 A1* | 3/2019 | Tamekuni ............ G02B 6/3831 |

(Continued)

FOREIGN PATENT DOCUMENTS

| | | | | |
|---|---|---|---|---|
| EP | 2600099 A2 * | 6/2013 | ......... | G01B 9/02007 |
| EP | 4006601 A1 * | 6/2022 | ............ | G01M 11/31 |

(Continued)

*Primary Examiner* — Uzma Alam
*Assistant Examiner* — Chad Andrew Reverman
(74) *Attorney, Agent, or Firm* — Peter S. Lee; Christopher S. Clancy; James H. Williams (57) ABSTRACT

An apparatus and method of inspection are provided that inspects the end-face of two or more fiber optic connectors simultaneously without the need to move a probe from one end-face to another end-face and inspecting them one by one.

9 Claims, 6 Drawing Sheets

(56) References Cited

U.S. PATENT DOCUMENTS

2019/0170610 A1\* 6/2019 Perron .................. G01M 11/33
2019/0212500 A1   7/2019 Haase et al.
2019/0391041 A1\* 12/2019 Baribault ............. G01M 11/088

FOREIGN PATENT DOCUMENTS

EP       3535615 B1 \* 9/2023  ............. B29C 59/16
JP       S63285452 A    11/1988

\* cited by examiner

ARRAYED VISUAL INSPECTORS FOR FIBER CONNECTORS AND ADAPTERS

CROSS-REFERENCE TO RELATED APPLICATION(S)

This application claims benefit to U.S. Provisional Patent Application No. 63/080,971, filed on Sep. 21, 2020, the entirety of which is hereby incorporated by reference herein.

BACKGROUND

Fiber optic links are susceptible to dust, oil, and other contaminants on the mating connector face. In the case of single-mode fiber (SMF) links, contaminated connectors can increase unwanted properties such as return loss, relative intensity noise, multipath interference, and insertion loss. Moreover, a single particle placed in the fiber core can completely block the optical signal from passing between two connectors. Due to its larger core size, multimode fiber (MMF) links are less affected by contaminated connectors. It is less likely that optical contamination can completely block light from a connector. However, the connector contamination can still have an impact on the channel performance due to the increase of attenuation, modal power distribution, and modal noise.

As the demand for higher data rates continues to grow, the optical channels, SMF, and MMF are exposed to higher transmission penalties and therefore becoming more sensitive to contamination in the connector end faces. An important issue with contaminated connectors is that they can cause damage to their connector end face and contaminate or damage the mated connector. During the network installation, it is essential to verify that the connector end face is cleaned prior to connection.

Fiber cassettes for holding a higher density of fiber optic cables are part of structured cabling deployed in data centers. They enable flexible interconnection of highspeed fiber links, in a small area footprint. Currently, inspection tools utilize a single microscope probe to inspect connectors or adapters installed onto their cassettes. Furthermore, the size of the optical elements in the microscope probes used in the existing equipment are large compared with the port dimensions found in standard or high-density cassettes. So, the existing inspection tools only allow for inspection of a single plug (e.g., LC), or connector, at a time. This inefficiency significantly increases the inspection time to inspect all the connectors included in a cassette of connectors. An apparatus capable of simultaneously inspecting more than one port of the cassettes would reduce the inspection time.

SUMMARY

The present disclosure describes an apparatus and method for inspecting a plurality of connectors for contamination, and more specifically to connector end-faces. According to some embodiments, the plurality of connectors may be installed onto a high-density fiber cassette. According to other embodiments, the plurality of connectors may be stand-alone and not yet installed onto the high-density fiber cassette.

According to an embodiment, an inspection apparatus for inspecting the end-face of two or more fiber optic connectors simultaneously without decoupling the probe from the two or more fiber optic connectors is disclosed. The inspection apparatus comprising a microscope probe comprising a light source, beam splitter, a fixed lens system, a variable focus lens system, and an image sensor.

DETAILED DESCRIPTION

Figure 1:
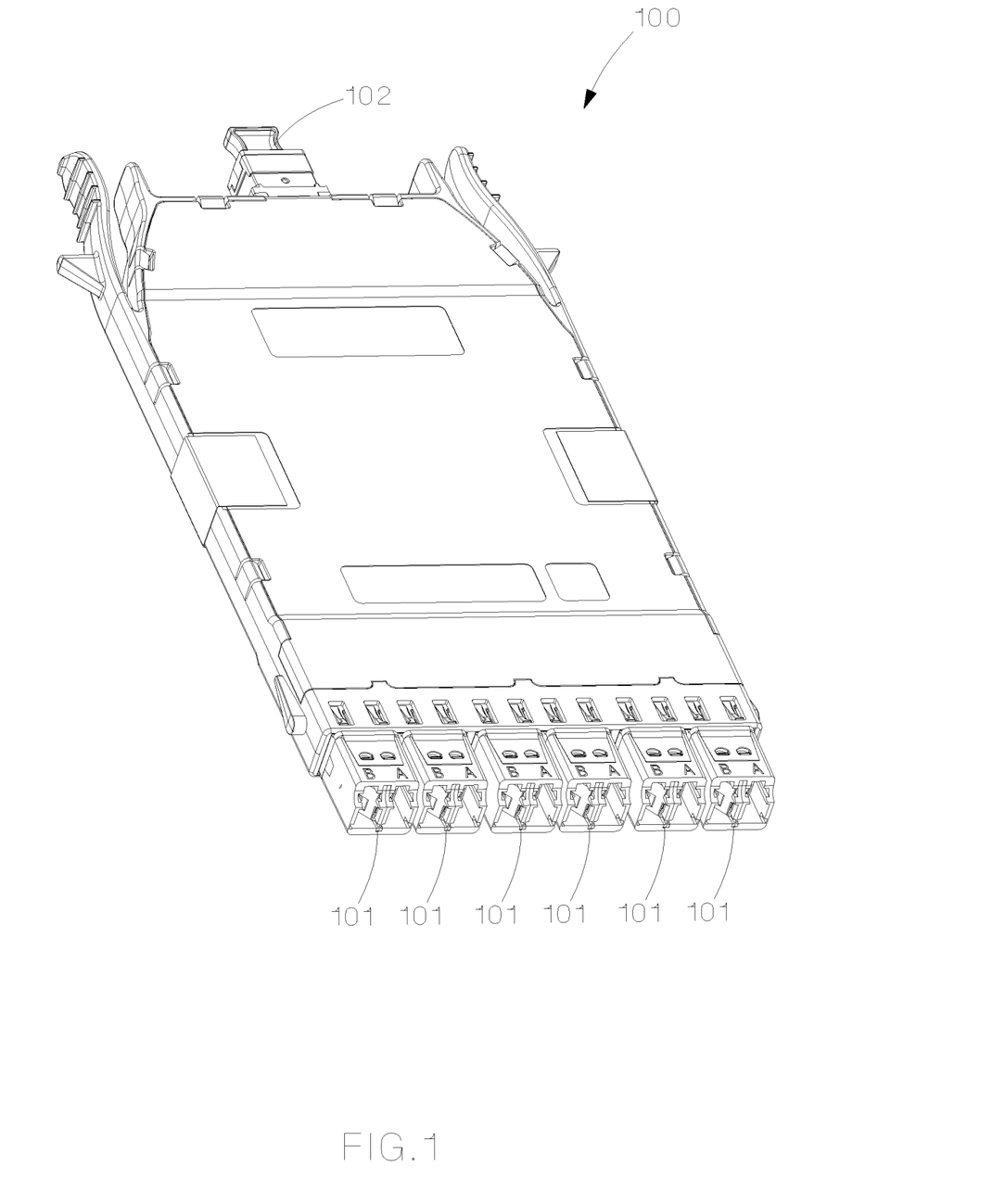
FIG. 1 shows a perspective view of a high-density cassette for holding a plurality of fiber optic cables.

A significant portion of the cassettes used in data centers employ MPO-to-LC (duplex) connectivity, as shown by the exemplary high-density cassette 100 shown in FIG. 1. The MPO may have one row of 12-fibers, two rows of 12-fibers each, one or two rows of 16-fibers each, or other predetermined configurations. Inside the high-density cassette, the MPO connector fibers are separated and terminated in duplex channels using LC individual LC connectors. According to the high-density cassette 100 shown in FIG. 1, the MPO connector 102 includes 12 fibers that are divided into six duplex LC connectors 101. The inspection of the high-density cassette 100 during manufacturing and/or installation is important to ensure a degree of cleanliness needed for the deployment of data centers. The LC connectors 101 are also represented by connector 400 having a connector end-face 401 as illustrated in the microscope system 300 and the microscope system 500 shown in FIG. 5 and FIG. 6, respectively.

Figure 2:
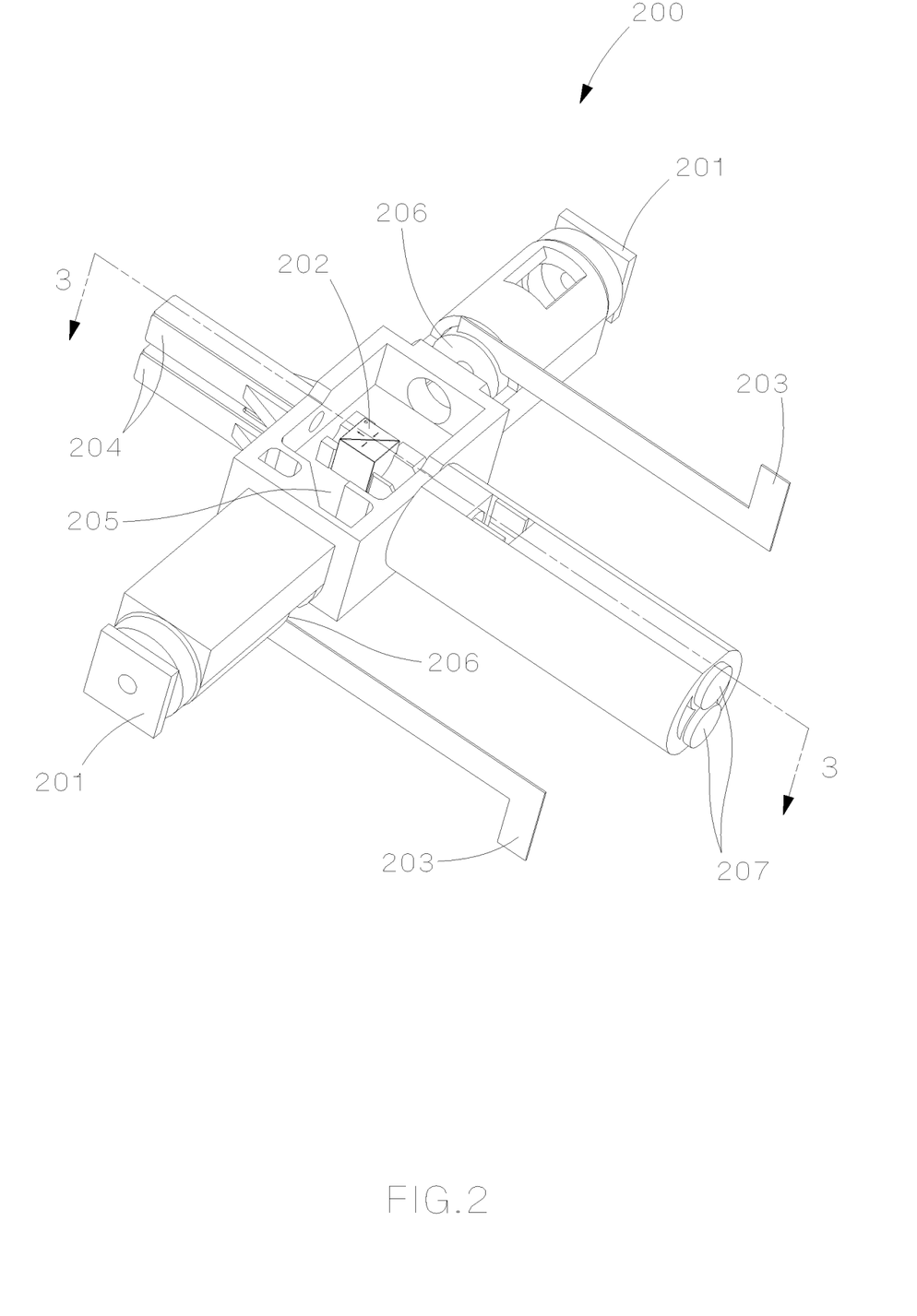
FIG. 2 shows a perspective view of an inspection tool for inspecting a connector end-face.

FIG. 2 is a perspective view of an inspection tool 200 for inspecting an optical interconnect such as a connector end-face. For example, the inspection tool 200 is configured to inspect the end-face 401 of a connector 400 included in LC duplex connector included on a high-density cassette 100 holding a plurality of connectors, as illustrated in FIG. 1. The inspection tool 200 is configured to inspect a corresponding connector end-face 401. The inspection tool 200 is configured to allow a plurality of the inspection tools 200 to be stacked on top of each other to create an assembled array system 700 for inspecting a plurality of connectors included in a high-density cassette, as will be described in more detail with reference to FIG. 6. Although the following disclosure describes using the inspection tool 200 to inspect the connector end-face 401, other types of optical interconnect components may be inspected such as end-faces found on adapters or other types of connectors relating to fiber optics.

The inspection tool 200 may be part of, or in communication with, a portable form factor visual inspector module, which may include controllers, displays (LCD, LEDs, or others), communication devices, processor(s), and/or machine-readable storage device(s) (e.g., computer memory) configured to store instructions to be executed by the processor(s) to implement the features described herein. The inspection tool 200 may also include a wireless interface for communicating with external devices using known wireless communication protocols.

Figure 3:
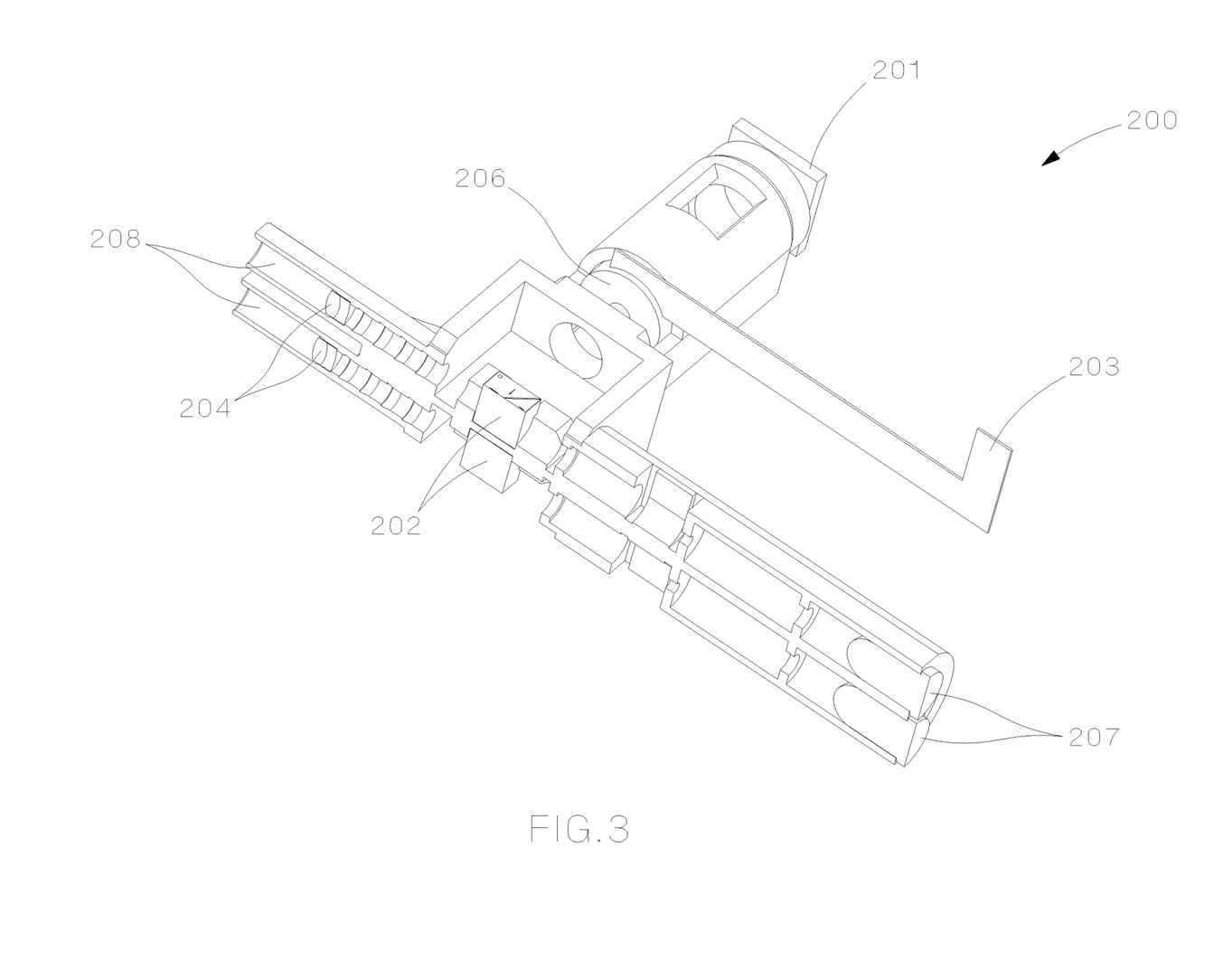
FIG. 3 shows a perspective cross-sectional view of the inspection tool shown in FIG. 2 taken about line 3-3.

The inspection tool 200 as shown in FIG. 2 includes two microscope probe systems, as well as any additional components, that together are used for capturing an image of the connector end-face 401 (the "microscope probe system"). Each microscope probe system includes a light source 207 (e.g., LED light), a beam splitter 202, a lens 204, a focus adjustable lens 206, an image sensor 201, an absorber section 205, and corresponding electrical connections 203. FIG. 3 shows a perspective sectional view of the internal components of the inspection tool 200, provided by taking the sectional line 3-3 from FIG. 2. From this sectional view of the inspection tool 200 illustrated in FIG. 3, the relative positions for the light source 207, beam splitter 202, lens 204, focus adjustable lens 206, and electrical connections 203 are shown. FIG. 3 also shows connection housings 208 for receiving the connector 400 to be inspected, as well as tunnel portions connecting the various optical components within the inspection tool 200 and for guiding the light being traveled to and from the various optical components within the inspection tool 200. According to some embodiments, the inspection tool 200 may comprise one or more microscope probe systems, and not be limited to the two microscope probe systems.

Each microscope probe system is designed to provide enough resolution to detect and identify contamination on the connector end-face 401. An inspection algorithm is then executed on the inspection tool 200, or a remote controller (e.g., laptop, desktop, or mobile device), to process the image and identify a degree of contamination on the connector end-face 401. The executed analysis may also compare the degree of the detected contamination to the limits defined by industry standards, e.g., IEC 61300-3-35 (Basic Test and Measurement Procedures Standard for Fiber Optic Interconnecting Devices and Passive Components). The inspection tool 200 may then be configured to provide a pass/fail signal based on whether the connector end-face is determined to meet/exceed, or fall below the industry standards. A determined fail condition may trigger additional signals (e.g., messages presented via a presentation device such as a display device of the visual inspector module) to clean the connectors by methods described in throughout this disclosure.

Figure 4:
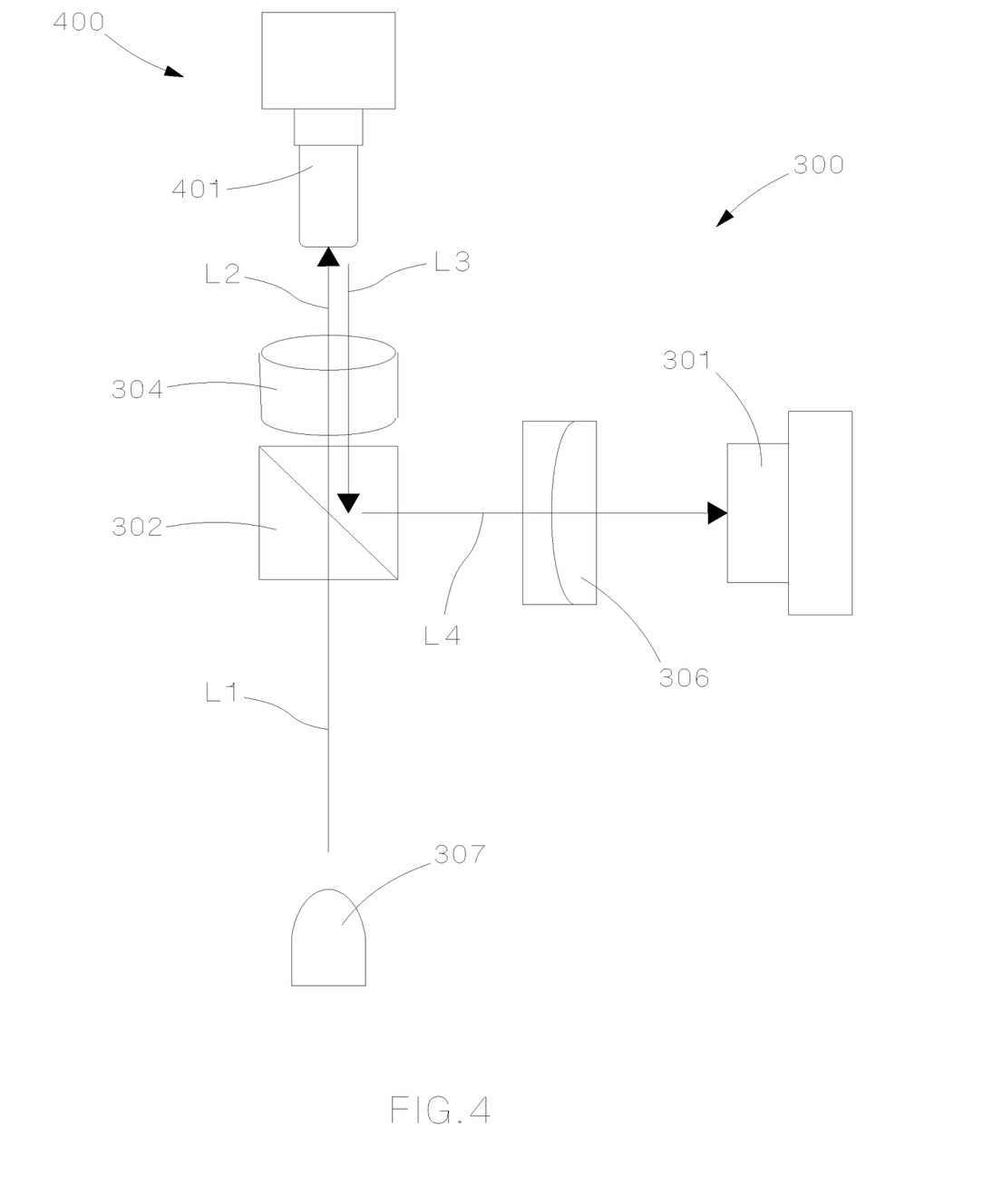
FIG. 4 shows a block diagram of a microscope probe, according to a first embodiment.

FIG. 4 shows a block diagram of an exemplary microscope probe system 300, according to an embodiment of the present disclosure. The microscope probe system 300 includes a light source 307 (e.g., an LED light source), a beam splitter 302, a fixed lens system 304, a variable focus lens system 306 (e.g., a liquid lens or other moving lens system), and an image sensor 301 (e.g., CMOS or CCD image sensor).

In operation, the light source 307 produces an illumination light that travels a first light path L1 directed to go through the beam splitter 302. From the beam splitter 302, the light is split into two paths that are approximately even, thus the beam splitter may be a 50% beam splitter. An absorption light path (not shown) deflects the light to an absorber section (e.g., absorber section 205) to minimize the background illumination (noise). A second light path L2 directs the light through the fixed lens system 304 to illuminate the connector end-face 401 (or other object being inspected). From the connector end-face 401, the light is reflected back via a third light path L3 back through the fixed lens system 304 to be reflected again by the beam splitter 302. The reflected light off the beam splitter 302 is redirected to travel via a fourth light path L4 to the variable focus lens system 304. The variable focus lens system 304, either by adjusting the focal length of the variable focus lens system 306 or by changing the distance between the connector end-face 401 and the variable focus lens system 306 or between the variable focus lens system 306 and the image sensor 301, forms a sharp image of the connector end-face 401 on the image sensor 301.

The adjustment controls of the variable focus lens system 306 applied to produce a sharp image on the image sensor 301 is controlled via electrical connections (e.g., electrical connections 203 shown in FIG. 2). The electrical connections 203 include the software, hardware, and/or circuitry for communicating electrical control signals to the microscope probe system 300 for controlling the variable focus lens system 306, where the controls are provided from an external computing device (e.g., external computer, a mobile computing device, cloud computing system, or dedicated circuits).

Figure 5:
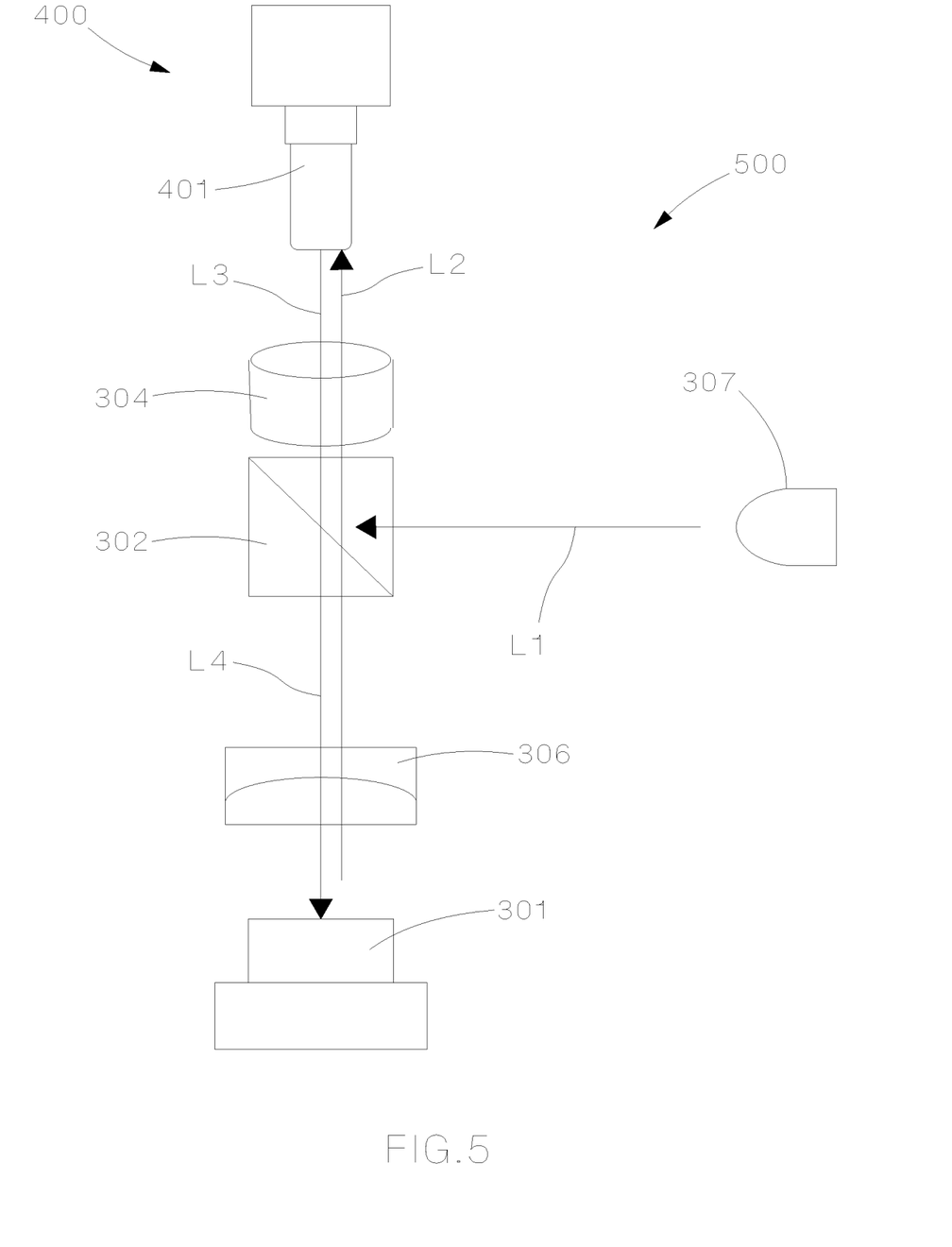
FIG. 5 shows a block diagram of a microscope probe, according to a second embodiment.

FIG. 5 shows a block diagram of an exemplary microscope probe system 500, according to an alternative embodiment of the present disclosure. The microscope probe system 500 includes the same components as the microscope probe system 500, albeit in a different arrangement of components. For example, the microscope probe system 500 also includes a light source 307 (e.g., an LED light source), a beam splitter 302, a fixed lens system 304, a variable focus lens system 306 (e.g., a liquid lens or other moving lens system), and an image sensor 301 (e.g., CMOS or CCD image sensor).

In operation, the light source 307 produces an illumination light that travels a first light path L1 directed to go through the beam splitter 302. From the beam splitter 302, the light is split into two paths that are approximately even, thus the beam splitter may be a 50% beam splitter. An absorption light path (not shown) deflects the light to an absorber section (e.g., absorber section 205) to minimize the background illumination (noise). A second light path L2 directs the light through the fixed lens system 304 to illuminate the connector end-face 401 (or other object being inspected). From the connector end-face 401, the light is reflected back via a third light path L3 back through the fixed lens system 304 to be reflected again by the beam splitter 302. The reflected light off the beam splitter 302 continues to travel via a fourth light path L4 to the variable focus lens system 304. The variable focus lens system 304, either by adjusting the focal length of the variable focus lens system 306 or by changing the distance between the connector end-face 401 and the variable focus lens system 306 or between the variable focus lens system 306 and the image sensor 301, forms a sharp image of the connector end-face 401 on the image sensor 301.

The inspection tool 200 may include one of the microscope probe system 300, the microscope probe system 500, or other similar microscope probe system that provides the variable focus lens system 306 in the compact form of the inspection tool 200.

Figure 6:
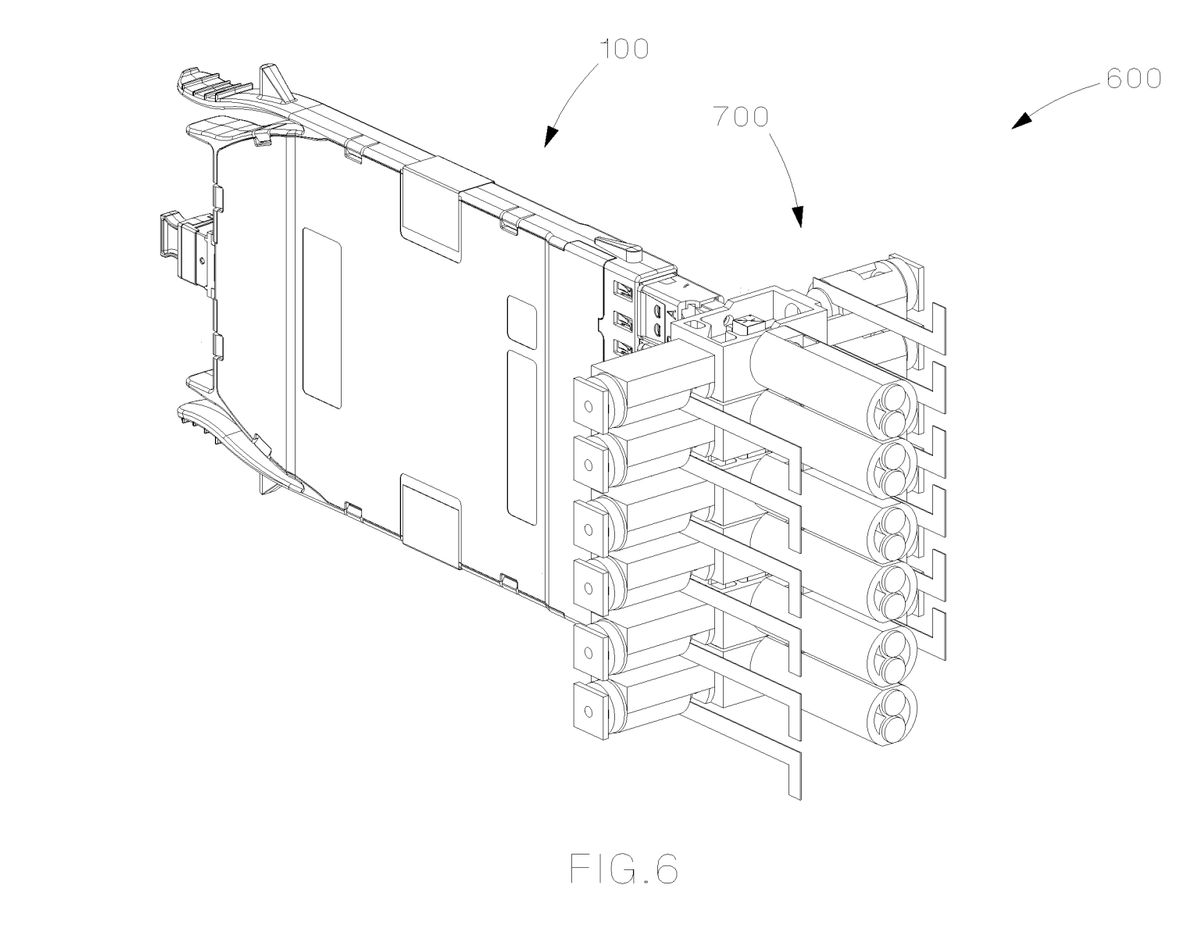
FIG. 6 shows a perspective view of an inspection system that includes an array of the inspection tools shown in FIG. 2 connected together in an assembled state for inspecting a plurality of connector end-faces included in a high-density cassette.

The microscope probe systems 300 and 500 are designed to be compact, so they can be implemented within the compact housing form of the inspection tool 200. This compact form allows for a plurality of the inspection tools 200 to be grouped together, conforming to form the array system 700 in an assembled state shown in FIG. 6. In FIG. 6, a perspective view of an inspection system 600 is shown that includes a plurality of the inspection tools 200 secured together to enable inspection of multiple ports of the high-density cassette 100 simultaneously. The inspection tool 200 includes a securing portion that provides the mechanism for securing (i.e., attaching) a plurality of inspection tools 200 securely together to form the array system 700 where the plurality of inspection tools 200 are stacked securely to each other as shown in FIG. 6. The securing portion may be one or more latches, one or more clips, a twist connection, or other securing means that allow for the compact form of the overall array system 700 to achieve inspection of multiple ports in the high-density cassette 100 simultaneously. Alternatively, the plurality of inspection tools 200 secured together in the inspection system 600 may be used to measure an optical fiber cable with multiple connectors simultaneously.

The inspection tool 200 disclosed herein provides a radical change in the way the cassettes or cables are currently being tested. The information, or images, acquired from all the ports, e.g., 12 ports, may be sent to a multi-core processor or multiprocessor system, where they can be analyzed in parallel. After analysis, the images may be stored for quality records. This produces a significant reduction in testing time while improving the quality during manufacturing or field installation.

Furthermore, while the particular preferred embodiments of the present disclosure have been shown and described, it will be obvious to those skilled in the art that changes and/or modifications may be made without departing from the teachings and scope described herein. The matter set forth in the foregoing description and accompanying drawings is offered by way of illustration only and not as limitation.

What is claimed is:

1. An inspection apparatus for inspecting a first end-face and a second end face of a duplex fiber optic connector installed into a duplex adapter of a cassette without decoupling the duplex fiber optic connector from the duplex adapter, the inspection apparatus comprising:
   a first microscope probe comprising:
      a first light source configured to emit a first light;
      a first beam splitter configured to receive the first light and direct at least a portion of the first light to a first fixed lens system towards the first end-face and direct at least a portion of the first light to a first variable focus lens system towards a first image sensor;
      the first fixed lens system configured to receive the portion of the first light and direct it towards the first end-face;
      the first variable focus lens system configured to receive the portion of the first light and direct it towards the first image sensor; and
      the first image sensor configured to receive the portion of the first light and capture an image of the first end-face;
   a second microscope probe comprising:
      a second light source configured to emit a second light;
      a second beam splitter configured to receive the second light and direct at least a portion of the second light to a second fixed lens system towards the second end-face and direct at least a portion of the second light to a variable focus lens system towards a second image sensor;
      the second fixed lens system configured to receive the portion of the second light and direct it towards the second end-face;
      the second variable focus lens system configured to receive the portion of the second light and direct it towards the second image sensor; and
      the second image sensor configured to receive the portion of the second light and capture an image of the second end-face; and
   a first securing portion configured to directly secure to a second securing portion of a secondary inspection apparatus to form an array including at least the inspection apparatus and the secondary inspection apparatus, wherein the secondary inspection apparatus includes a first secondary microscope probe and a second secondary microscope probe for inspecting a first end-face and a second end face of a secondary duplex fiber optic connector installed into a secondary duplex adapter of the cassette without decoupling the secondary duplex fiber optic connector from the secondary duplex adapter.

2. The inspection apparatus of claim 1, wherein the first image sensor is a CMOS or CCD image sensor.

3. The inspection apparatus of claim 1, wherein the first variable focus lens system is a moving lens system using a liquid lens.

4. The inspection apparatus of claim 1, wherein the array is configured to simultaneously inspect two or more duplex connectors installed onto respective adapters of the cassette.

5. The inspection apparatus of claim 1, further comprising:
   a display device configured to display a message corresponding to a test result determined by the inspection apparatus.

6. An inspection apparatus for inspecting a first end-face and a second end face of a duplex fiber optic connector installed into a duplex adapter of a cassette without decoupling the duplex fiber optic connector from the duplex adapter, the inspection apparatus comprising:
   a first microscope probe comprising:
      a first light source configured to emit a first light;
      a first beam splitter configured to receive the first light and direct at least a portion of the first light to a first fixed lens system towards the first end-face and direct at least a portion of the first light to a first variable focus lens system towards a first image sensor;
      the first fixed lens system configured to receive the portion of the first light and direct it towards the first end-face;
      the first variable focus lens system configured to receive the portion of the first light and direct it towards the first image sensor; and
      the first image sensor configured to receive the portion of the first light and capture an image of the first end-face;
   a second microscope probe comprising:
      a second light source configured to emit a second light;
      a second beam splitter configured to receive the second light and direct at least a portion of the second light to a second fixed lens system towards the second end-face and direct at least a portion of the second light to a variable focus lens system towards a second image sensor;
      the second fixed lens system configured to receive the portion of the second light and direct it towards the second end-face;
      the second variable focus lens system configured to receive the portion of the second light and direct it towards the second image sensor; and
      the second image sensor configured to receive the portion of the second light and capture an image of the second end-face; and a first securing portion configured to directly secure to a second securing portion of a secondary inspection apparatus to form an array including at least the inspection apparatus and the secondary inspection apparatus, wherein the secondary inspection apparatus includes a first secondary microscope probe and a second secondary microscope probe for inspecting a first end-face and a second end face of a secondary duplex fiber optic connector installed into a secondary duplex adapter of the cassette without decoupling the secondary duplex fiber optic connector from the secondary duplex adapter;

a processor; and a machine-readable storage device in communication with the processor, the storage device configured to store instructions for causing the processor to:
   control the microscope probe to conduct a testing process on the fiber optic connector; and
   control a display device to display a test result message based on the testing process.

7. The inspection apparatus of claim 6, wherein the first image sensor is a CMOS or CCD image sensor.

8. The inspection apparatus of claim 6, wherein the first variable focus lens system is a moving lens system using a liquid lens.

9. The inspection apparatus of claim 6, wherein the array is configured to simultaneously inspect two or more duplex connectors installed onto respective adapters of the cassette.

* * * * *